United States Patent [19]

Ries

[11] Patent Number: 4,468,981

[45] Date of Patent: Sep. 4, 1984

[54] DRIVE AXLE AND FLUID PUMP ASSEMBLY

[75] Inventor: Donald L. Ries, Dearborn Heights, Mich.

[73] Assignee: Rockwell International Corporation, Pittsburgh, Pa.

[21] Appl. No.: 307,840

[22] Filed: Oct. 2, 1981

[51] Int. Cl.³ .......................... F16H 1/38; F16H 1/40
[52] U.S. Cl. ........................................ 74/713; 74/710
[58] Field of Search .................... 74/710, 713, 607; 188/264 E, 264 P, 71.6

[56] References Cited

U.S. PATENT DOCUMENTS

| | | | |
|---|---|---|---|
| 1,380,584 | 6/1921 | Parker | 188/264 E |
| 2,842,226 | 7/1958 | Liebel | 188/264 P |
| 2,879,867 | 3/1959 | Rike | 188/152 |
| 2,940,549 | 6/1960 | Hause et al. | 188/71.5 |
| 3,033,329 | 5/1962 | Malloy | 188/264 E |
| 3,061,048 | 10/1962 | Alsobrooks et al. | 188/264 E |
| 3,118,387 | 1/1964 | Aldrich | 418/166 |
| 3,580,368 | 5/1971 | Heck | 188/264 E |
| 4,140,198 | 2/1979 | Chamberlain | 188/71.6 |
| 4,146,116 | 3/1979 | Cumming | 188/71.8 |
| 4,352,301 | 10/1982 | Fleury | 74/713 |
| 4,391,351 | 7/1983 | Jirousek et al. | 74/607 |

FOREIGN PATENT DOCUMENTS

| | | | |
|---|---|---|---|
| 214082 | 1/1957 | Australia | 74/713 |
| 1530583 | 10/1969 | Fed. Rep. of Germany | 74/713 |
| 2324418 | 12/1974 | Fed. Rep. of Germany | 74/710 |
| 71232 | 10/1959 | France | 188/264 E |
| 170173 | 10/1921 | United Kingdom | 74/710 |

Primary Examiner—Allan D. Herrmann
Assistant Examiner—D. Wright

[57] ABSTRACT

A vehicle drive axle including a differential carrier and a differential driven by an input shaft. A pump housing is mounted to the forward end of the carrier in circumferentially enclosing relation to a portion of the input shaft and includes rotary fluid displacement means driven internally by the input shaft.

4 Claims, 6 Drawing Figures

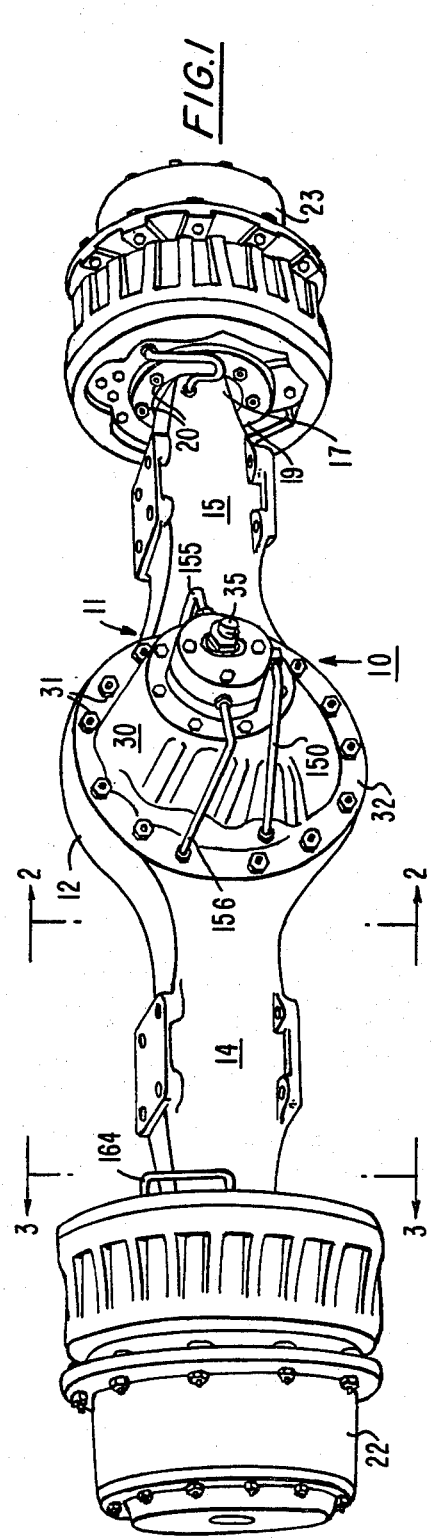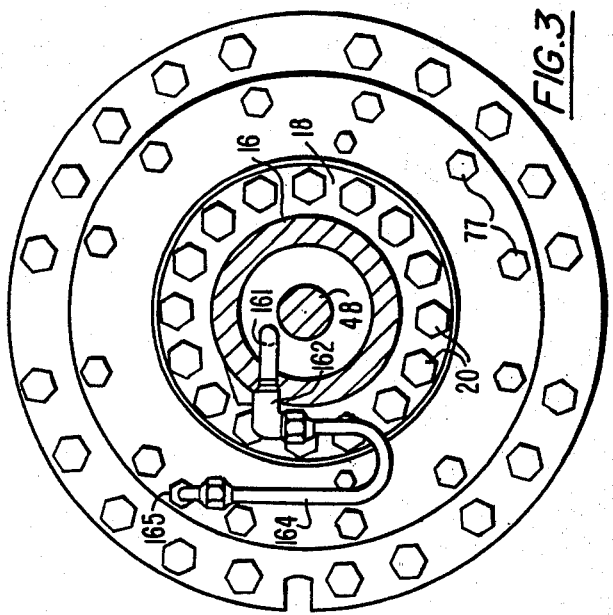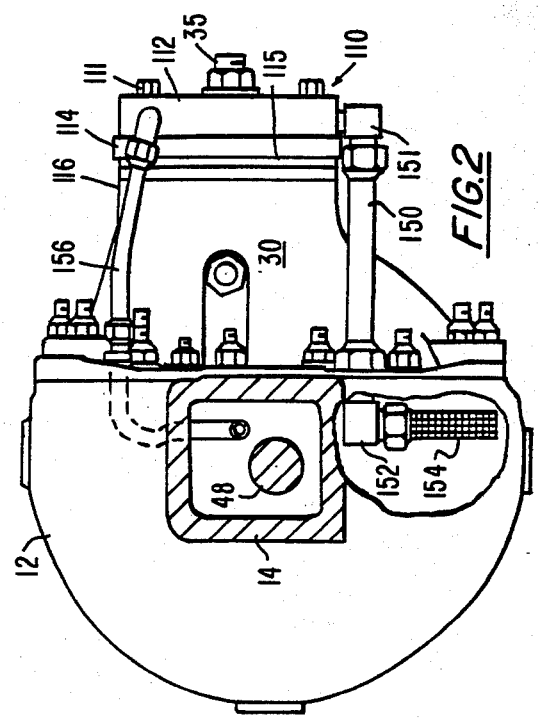

DRIVE AXLE AND FLUID PUMP ASSEMBLY

BACKGROUND OF THE INVENTION

1. Field of the Invention

This invention relates to a drive axle and fluid pump assembly for a vehicle which requires a source of fluid under pressure. The drive axle and fluid pump assembly is particularly useful in providing a source of lubricating oil for cooling a friction brake of the type disclosed in U.S. Pat. No. 4,146,116.

2. Description of the Prior Art

There have heretofore been provided a number of axles which include mechanisms for pumping a liquid coolant to extract thermal energy generated by a plurality of discs in a friction brake such as those disclosed in U.S. Pat. Nos. 2,879,867; 2,940,549; 3,033,329 and 3,061,048. Those systems require additional, relatively complex elements to provide a pump mechanism at the wheel end and several require separate reservoirs and expansion chambers, as well as radiators for cooling the liquid. These designs are relatively complex and the additional elements provided at the wheel ends increase both the cost and weight of the vehicle.

Pumps have also been provided at locations other than at the wheel ends but those arrangements require a suitable location for mounting the pump and power transfer means for driving the pump in addition to a separate reservoir.

SUMMARY OF THE INVENTION

It is therefore an object of this invention to provide a compact pump assembly mounted directly on a drive axle.

It is another object of this invention to provide a rotary pump which can be mounted to a drive axle differential carrier and driven internally by the differential carrier input shaft.

It is another object of this invention to provide a drive axle and pump assembly which may utilize the lubricating oil in the drive axle as a liquid medium without the need of a separate reservoir or heat dissipating mechanism.

These and other objects of the invention are provided in a vehicle drive axle including a differential carrier and a differential mechanism driven by a shaft mounted for rotation by a prime mover. A pump housing is mounted to the differential carrier. The pump housing circumferentially encloses a portion of the shaft and includes fluid displacement means in a cavity which communicates with a fluid inlet port and a fluid outlet port. The fluid displacement means is driven by the shaft to displace fluid from the inlet port to the outlet port under pressure.

In the preferred embodiment, a pair of pump housing members, each having an aperture therethrough and defining a radially extending annular cavity therebetween are secured in circumferential enclosing relationship to the input shaft at the outer end of the differential carrier bore. Fluid displacement means including at least one element concentric with the input shaft and rotatable in the cavity and driven by means engaging the input shaft displace fluid from the inlet port to the outlet port. The fluid displacement means is preferably a gerotor type pump which includes a rotatable element having a plurality of external gear teeth meshing with internal gear teeth of an annular outer element having one more tooth than the rotatable element and a peripheral surface located within a bore eccentric within a ring which in turn may rotate through an arc of 180°.

The invention, and the advantages offered thereby, will become apparent from the following detailed description of the embodiment shown by the accompanying drawings.

DESCRIPTION OF THE DRAWINGS

In the drawings wherein like reference numerals refer to like parts:

FIG. 1 is a perspective view of the drive axle and fluid pump assembly according to a preferred embodiment of the invention;

FIG. 2 is a sectional view taken along the line 2—2 of FIG. 1;

FIG. 3 is sectional view taken along the line 3—3 of FIG. 1;

DESCRIPTION OF THE INVENTION

Figure 4:
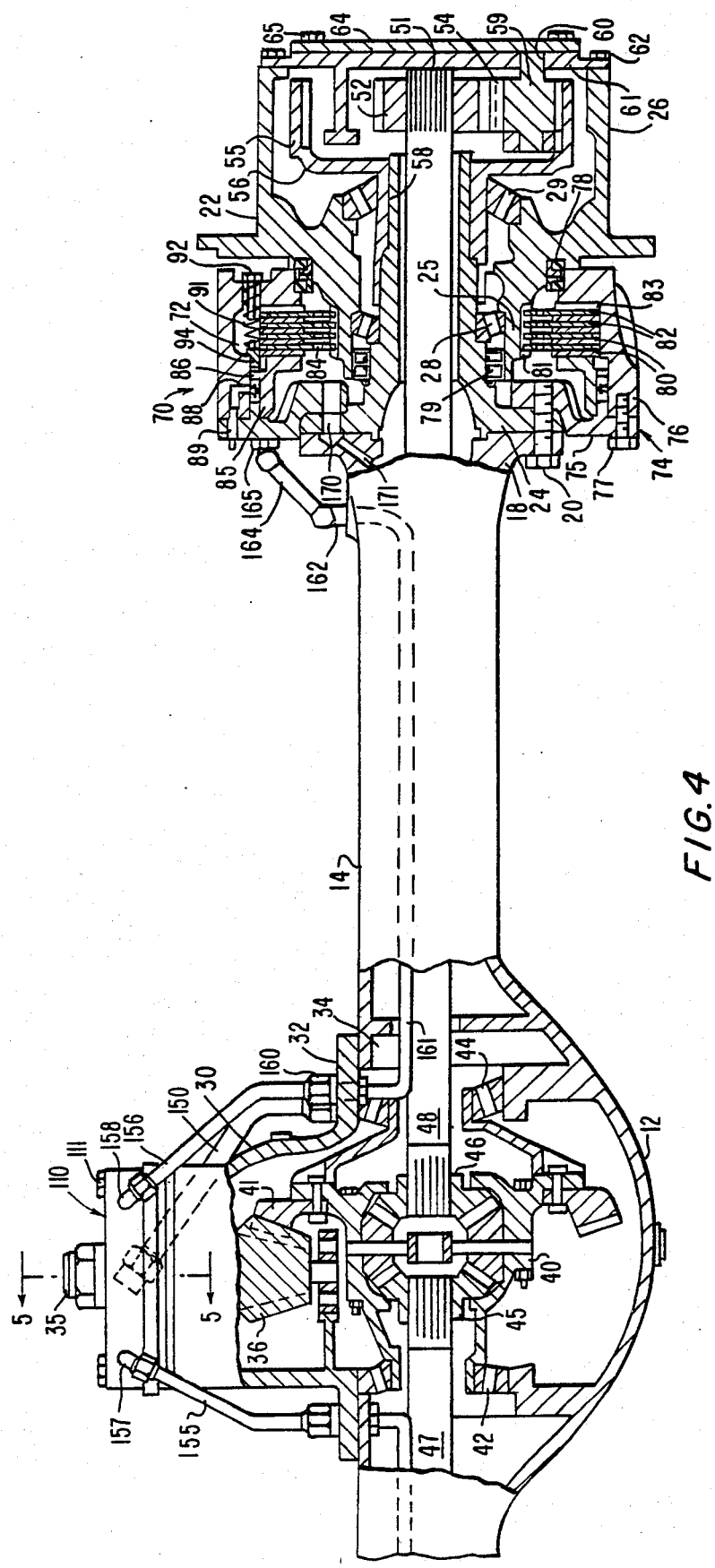
FIG. 4 is a plan view, partly in section, showing the differential mechanism and the wheel and brake assembly at one end of the drive axle of FIG. 1.

With reference to FIG. 1, there is shown a planetary drive axle and pump assembly generally designated by the reference numeral 10. The planetary drive axle 10 is comprised of a hollow axle housing 11 having a generally spheroid shaped bowl 12 forming a differential housing at the center thereof and oppositely extending beams 14 and 15 of generally rectangular cross section but tapering to a circular cross section 16, 17 adjacent to the radially extending flanges 18 and 19 provided at the ends of the hollow axle housing 11. A pair of spindles, each respectively secured to one of the axle flanges 18 and 19 by means of a plurality of bolts 20, are provided to rotatably support wheel hubs 22 and 23 and associated brake assemblies.

A differential carrier 30 is secured to the hollow axle housing 11 in conventional manner by a plurality of mounting bolts 31 which secure the differential carrier flange 32 to a forward facing wall of the axle housing 11 and close a generally circular opening 34 provided in the hollow axle housing 11.

An input shaft 35 having a pinion gear 36 intergrally formed therewith is rotatably mounted by a pair of bearings 38, 39 carried by the necked-down forward portion of the differential carrier 30. The teeth of the pinion gear 36 mesh with a ring gear 41 secured to a differential case 40 mounted for rotation within differential axle housing bowl 12 by means of the roller bearings 42 and 44. The differential case 40 includes a pair of side gears 45, 46 which are respectively splined to axle shafts 47 and 48. Power from a prime mover is provided by means of a drive shaft and universal coupling to the input shaft 35 of the differential carrier 30. The drive shaft and universal coupling are not shown but may be provided in conventional manner by means of a yoke 49 (see FIG. 5) splined to the input shaft 35. The input shaft pinion gear 36 drives the ring gear 41 and the differential 40 divides the torque provided by the prime mover to the axle shafts 47, 48 which in turn drive the wheel ends 22 and 23.

With reference to FIG. 4, the mounting of the wheel hub 22 on spindle 24 secured by means of the bolts 20 to the axle housing flange 18 will be described, it being understood that the wheel end 23 and its associated brake assembly are respectively rotatably mounted to a spindle and secured to the flange 19 at the other end of the hollow axle housing 11 in a similar manner.

The axle shaft 48 extends through the hollow interior of the axle housing beam 14 and the hollow interior of the spindle 24 and is splined at 51 to a sun gear 52. The sun gear 52 drives a plurality, usually three, planetary gears 54 internally of a floating ring gear 55 supported by a hub 56 splined at 58 to the axially outer end of the spindle 24. The planetary pins 59 are seated in apertures 60 provided to a planetary spider 61 which is secured by bolts 62 to the axially outer edge of a cylindrical surface 26 of the wheel hub 22. The wheel hub 22 is mounted for rotation about the spindle 24 by a bearing 28 and about the ring gear hub 56 by a bearing 29. A wheel cover 64 is secured to the planetary spider 61 by means of a plurality of bolts 65.

A brake mechanism 70 is provided in a sealed annular chamber 72 located between the wheel hub 22 and the axle flange 18 radially outwardly of the spindle 24 and a flange 25 of the wheel hub 22. The chamber 72 is defined and enclosed by a housing 74 comprised of an end plate 75 is secured to the axle housing flange 18 by bolts 20 and an annular outer housing member 76 secured to the end plate 75 by means of bolts 77. Rotary seals 78 and 79 are respectively provided between the housing member 76 and the wheel hub 22 and between wheel hub flange 25 and the spindle 24 to prevent fluid leakage from the chamber 72.

A plurality of annular friction discs 80 and 82 are alternately assembled to provide a stack of friction discs internally of the chamber 72. The friction discs 80 are splined at their radially inner periphery for engagement with a plurality of splines 81 provided circumferentially around the radially outer surface of the wheel hub flange 25. The friction discs 82 are splined at their radially outer periphery for engagement with a plurality of splines 83 provided circumferentially around the radially inner surface of the outer housing member 76. A plurality of apertures 84 are provided circumferentially around each of the friction discs 80 and 82. The friction discs 80 thus constitute a plurality of rotor discs mounted for rotation with the wheel hub 22 while the splines 81 permit limited axial movement of the rotor discs relative to the hub flange 25. The stationary discs 82 constitute stator discs secured against rotation by the splines 83 of the outer housing member 76 which permit limited axial movement of the stator discs 82 relative to the housing member 76.

An annular piston 85, generally L-shaped in cross section and having a radially extending flange 86 is provided interiorly of the housing 74. The axially outer surface of the piston abuts the inner surface of the axially innermost stator disc 82. The radially outer surface of the piston flange 86 and the radially outer annular surface of the piston 85 respectively bear against the radially inner surface of the outer housing member 76 and the radially inner surface of a cylindrical flange provided interiorly of the end plate 75 defining a hydraulic chamber 88 therebetween. A fluid passage 89 through the end plate 75 and outer housing member 76 enables the vehicle operator to selectively provide hydraulic fluid from a source (not shown) to the pressure chamber 88 thereby moving piston 85 to the right as shown in FIG. 4 to engage the axially facing surfaces of the stator disc 82 with adjacent surfaces of the rotor discs 80 and develop a sufficient braking torque to resist rotation of the wheel hub 22 relative to the drive axle housing 11. A plurality of return springs 91 mounted on bolts 92 act on an annular ring 94 abutting the piston 85 and move the piston axially away from the friction disc 80 and 82 when the brake actuating hydraulic fluid pressure is released by the vehicle operator.

When the brake mechanism 70 is actuated, frictional contact is established throughout a full 360° of the inner facing areas of the friction discs 80 and 82. Substantial thermal energy is generated which tends to shorten the useful life of the friction material provided to the discs 80 and 82. In the present invention, the friction discs 80 and 82 are subjected to a circulating flow of lubricating fluid to avoid the deleterious effects of the thermal energy generated when the brake mechanism is actuated.

A sump of lubricating oil is normally provided interiorly of the drive axle 11 to provide a source of oil for lubricating the input shaft 35, the mechanism within differential case 40 and the planetary gear sets provided within of the wheel hubs 22 and 23 at the outer ends of the axle shafts 47 and 48. After assembly, a quantity of lubricating oil is introduced to the axle 10, usually through an access port in the bowl 12 to fill the bowl, the beam sections 14, 15, the spindles and the wheel hubs 22, 23 to about the level of the axal shafts 47 and 48. The drive axle 10 is therefore normally about half full of lubricating oil which is distributed by rotation of the ring gear 41 and differential case 40 to lubricate moving parts provided within the bowl 12 and distributed by the planetary set of gears internally of the wheel hubs 22, 23 to lubricate the moving parts therein. It is preferred that the level of lubricating oil be no higher than the axle shafts to better dissipate the heat of operation by permitting the rotating driving elements to enter and pass through the bath of oil and to allow the oil to drain or be thrown from the moving elements as they exit the bath before they become emersed again on the next cycle.

A rotary pump generally designated by the numeral 110 is provided circumferentially around the input shaft 35 and secured by means of a plurality of bolts to the forward, necked-down end of the differential carrier 30. The pump 110 is a positive displacement pump of the type disclosed in U.S. Pat. No. 3,118,387 and generally referred to as a gerotor pump.

Figure 5:
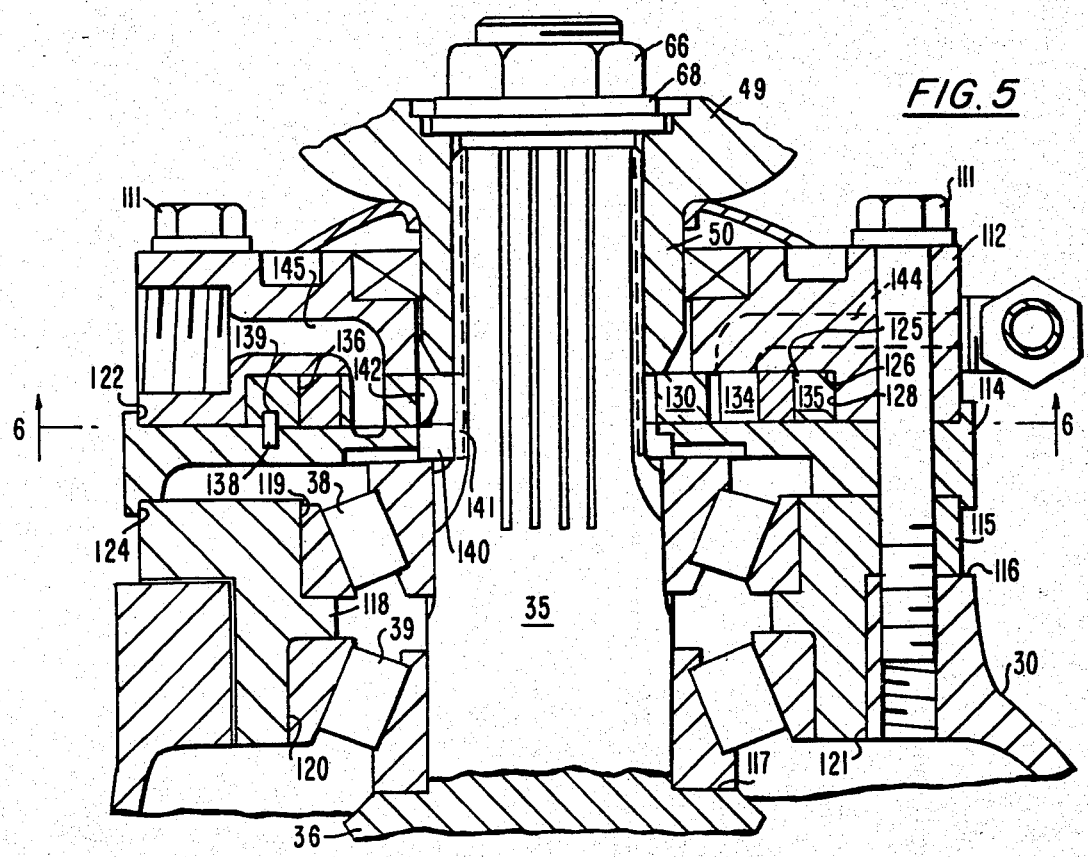
FIG. 5 is a sectional view taken generally along the line 5—5 of FIG. 4.
Figure 6:
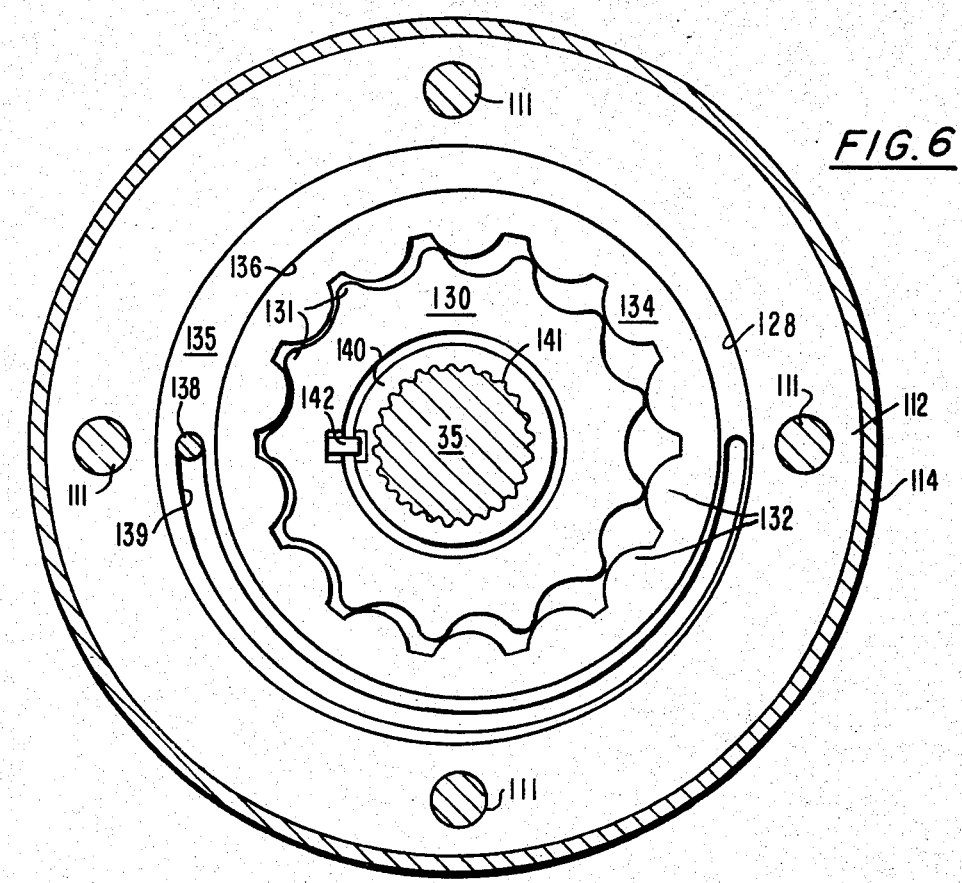
FIG. 6 is sectional view taken along the lines 6—6 of FIG. 5.

With reference to FIGS. 5 and 6, the pump 110 includes outer housing member 112 and inner housing member 114, both of which are secured along with a bearing block 115 by bolts 111 to the forward facing surface 116 of the necked-down portion of the differential carrier 30. The annular bearing block 115 is generally L-shaped in cross section with a radially inwardly projecting flange 118 separating a pair of cylindrical seats 119 and 120 for the input shaft bearings 38 and 39, respectively. The inner race of the bearing 39 axially abuts a radial surface 117 at the outer end of the pinion gear 36. The inner race of the bearing 38 abuts a drive ring 140 which in turn abuts the splined neck 50 of yoke 49. Yoke 49 is secured against axial displacement relative to shaft 35 by nut 66 and thrust washer 68. The nut 66 and the thrust washer 68 may be tightened to apply the proper load to the bearings 38 and 39. The seats 119 and 120 and the flange 118 of bearing block 115 thus respectively, radially and axially locate the bearings 38 and 39 rotatably mounting the input shaft in the bore 121 provided to the differential carrier 30.

The inner pump housing 114 is counterbored on both surfaces to provide shoulders 122 and 124 which respectively serve to pilot the outer pump housing 112 and the inner pump housing 114 relative to the radially outer surface of the bearing block 115 and the axis of rotation of the input shaft 35.

The surfaces 126 and 128 of outer pump housing 112 define an annular cavity concentric with the input shaft 35 and extending substantially radially outward relative to to the input shaft.

Fluid displacement means are provided interiorly of the cavity 125 and comprise an inner rotating element 130 having a plurality of external gear teeth 13, an annular outer rotary element 132 having one more internal gear teeth 134 than the number of teeth 131 provided to the inner rotating element 130, and a reversing ring 135 having an eccentric bore 136. A pin 138 seated in a bore in inner housing member 114 engages a groove 139 in reversing ring 135 which permits rotary sliding movement of the reversing ring through an arc of 180°.

A drive ring 140 splined at 141 to the input shaft 35 is keyed at 142 to the inner rotating element 130 and rotates the fluid displacement elements 130 and 134 internally of the pump housing cavity 125. The outer pump housing 112 is drilled to provide an inlet port 144 (shown by dotted lines) and an outlet port 145, both of which communicate with the cavity 125 at the interface between the inner rotor 130 and the outer rotor 134.

The pump 110 is connected by a suction line 150 to the sump of lubricating oil provided interiorly of the axle housing bowl 12. The suction line 150 is comprised of a suitable length of 1" diameter steel tubing plumbed at one end by means of the fitting 151 to the inlet port 144 of the pump 110. The other end of the suction line 150 is plumbed through the differential carrier 30 and connected by means of a fitting 152 to a filter 154 located in a sump provided by the bottom of the hollow axle housing bowl 12 and containing a pool of lubricating oil as previously described.

Fluid passages are also provided between pump 110 and the sealed friction disc chambers at each end of the drive axle 10 by pressure lines 155 and 156. Pressure lines 55 and 56 are each comprised of a suitable length of ⅝" diameter steel tubing, each of which is connected at one end by fittings 157 and 158 to ports in the outer pump housing 112 which communicate with the pump outlet port 145. The pressure line 56 is plumbed by means of a fitting 160 through the differential carrier 30 and connected with a length of tubing 161 which extends along the axial length of the hollow axle beam portion 14 where it is bent and connected to a fitting 162 provided through the circular cross section portion 16 of the hollow axal housing 11. The pressure line is continued by a length of tubing 164 connected at one end to the fitting 162 and at its other end to a fitting 165 threaded to a bore through the end plate 75 of brake mechanism housing 74 and opening into the sealed annular chamber 72.

As best shown by FIG. 4, fluid passage means are also provided between the sealed annular chamber 72 and the interior of hollow axle housing 11 by means of a bore 170 extending axially through the end plate 75, the flange of spindle 24 and into the flange 18 of the axal housing 11 where it intersects with a bore 171 providing access to the interior of the hollow axle housing 11.

The pressure line comprised of tubing 156, 161 and 164, port 166 and bore 168 provide a pressurized fluid passage means between the pump 110 and the sealed annular chamber 72 whereby lubricating oil from the sump provided at the bottom bowl 12 is delivered to the sealed annular chamber to flow across and circulate around the friction discs 80 and 82 and through the apertures 84 and grooves provided to across the interfacing surfaces of the friction discs to absorb thermal energy generated by the discs during braking. The bore 170 through the end plate 75 and the spindle flange and the bore 171 through the axle housing flange 18 provide a second passage means from the chamber 72 to the interior of the hollow axle housing 11 permitting lubricating oil which has absorbed thermal energy from the friction discs 80 and 82 to return to the interior of hollow axle housing 11 and the sump of lubricating oil provided therein where the thermal energy will be dissipated through the mass of the lubricating oil and the walls of the hollow axle housing 11.

The pressure line 155 is connected by similar means to deliver lubricating fluid to the annular friction disc chamber provided at the other end of the axle housing 11 and similar fluid passage ports are provided permitting heated lubricating oil to flow from that chamber to the interior of hollow axle housing 11.

Seal 79 prevents the flow of lubricating oil from the chamber 72 to the bearings 28 and 29 rotatably mounting the wheel hub 22. The seal 79 thus prevents entry of lubricating oil heated by the friction discs 80 and 82 to the bearings 28 and 29 and to the planetary gear set 52, 54, 55, thereby preventing an increase in temperature or in volume of the lubricating oil normally provided to those bearings and that gear set through the hollow interior of the spindle 24.

The positive displacement gerotor pump 110 provides a compact and efficient rotary pump mounted to the differential carrier of a drive axle and driven internally by the carrier input shaft. The pump does not require any external exposed power transfer means and, in the embodiment disclosed, it utilizes an existing source of lubricating oil for cooling the friction discs at each end of the axle housing.

The invention may also be embodied in other specific forms without departing from the spirit or essential characteristics thereof. The foregoing description of the preferred embodiment of the invention is therefore to be considered to be illustrative and not restrictive, the scope of the invention being defined by the appended claims and all changes which come within the meaning and range of equivalency of the claims are therefore intended to be embraced thereby.

I claim:

1. A vehicle drive axle and fluid pump assembly comprising an axle including a differential housing mounting a differential carrier having a forward facing necked down portion and a differential mechanism driven by a shaft extending through and mounted for rotation in a bore in said differential carrier, a forward facing surface at the end of said necked down portion of said carrier, a pair of pump housing members, each of said pump housing members having an aperture concentric with said shaft, means piloting said housing members relative to the axis of rotation of said shaft, means securing said pump housing members to said forward facing surface with said housing members defining a radially extending annular cavity therebetween, a fluid inlet port and a fluid outlet port communicating with said cavity, fluid displacement means including at least one element concentric with said shaft and rotatable in said cavity and means drivingly engaging said shaft and said rotatable element for displacing fluid from said inlet port to said outlet port under pressure.

2. The vehicle drive axle and fluid pump assembly defined by claim 1 including a bearing block radially and axially locating bearing means rotatably mounting said shaft in said bore and at least one of said housing members is piloted on said bearing block.

3. The vehicle drive axle and fluid pump assembly defined by claim 1 wherein said rotatable element has a plurality of external gear teeth meshing with internal gear teeth of an annular outer element having one more tooth than said rotatable element and a peripheral surface located within a bore eccentric in a ring, the radially outer surface of which is seated for rotary sliding movement through an arc of 180° against the radially outer surface of said cavity.

4. The vehicle drive axle and fluid pump assembly defined by claim 1 wherein said shaft is mounted for rotation by bearing means located in said bore, said means drivingly engaging said shaft and said rotatable element comprises an annular member concentric with said shaft and abutting one of said bearing means, and means fixing said annular member and said bearing means against axial movement relative to said shaft.

* * * * *